(12) United States Patent
Thut

(10) Patent No.: US 9,612,055 B1
(45) Date of Patent: Apr. 4, 2017

(54) SELECTIVE CIRCULATION AND TRANSFER IN A MOLTEN METAL FURNACE

(71) Applicant: Bruno Thut, Chagrin Falls, OH (US)

(72) Inventor: Bruno Thut, Chagrin Falls, OH (US)

( * ) Notice: Subject to any disclaimer, the term of this patent is extended or adjusted under 35 U.S.C. 154(b) by 0 days.

(21) Appl. No.: 14/969,562

(22) Filed: Dec. 15, 2015

(51) Int. Cl.
*B22D 37/00* (2006.01)
*F27D 3/14* (2006.01)
*F27B 3/19* (2006.01)

(52) U.S. Cl.
CPC . *F27D 3/14* (2013.01); *F27B 3/19* (2013.01)

(58) Field of Classification Search
CPC ................................. B22D 37/00; F04D 7/065
USPC ........................................................ 266/236
See application file for complete search history.

(56) References Cited

U.S. PATENT DOCUMENTS

| | | | |
|---|---|---|---|
| 7,507,365 B2 | 3/2009 | Thut | |
| 7,687,017 B2 | 3/2010 | Thut | |
| 8,337,746 B2 | 12/2012 | Cooper | |
| 8,366,993 B2 | 2/2013 | Cooper | |
| 8,613,884 B2 | 12/2013 | Cooper | |
| 8,753,563 B2 | 6/2014 | Cooper | |
| 9,017,597 B2 | 4/2015 | Cooper | |
| 9,057,377 B1 | 6/2015 | Thut | |
| 9,074,601 B1 | 7/2015 | Thut | |
| 9,156,087 B2 | 10/2015 | Cooper et al. | |
| 9,205,490 B2 | 12/2015 | Cooper et al. | |
| 2009/0057965 A1* | 3/2009 | Morando | C22B 9/023 266/227 |
| 2013/0105102 A1 | 5/2013 | Cooper | |
| 2013/0292427 A1 | 11/2013 | Cooper | |
| 2013/0299525 A1 | 11/2013 | Cooper et al. | |
| 2013/0306687 A1 | 11/2013 | Cooper et al. | |
| 2014/0252701 A1 | 9/2014 | Cooper | |
| 2015/0192364 A1 | 7/2015 | Cooper | |
| 2015/0224574 A1 | 8/2015 | Cooper | |
| 2015/0285557 A1 | 10/2015 | Cooper | |
| 2015/0285558 A1 | 10/2015 | Cooper | |
| 2015/0328682 A1 | 11/2015 | Cooper et al. | |
| 2015/0328683 A1 | 11/2015 | Cooper et al. | |
| 2016/0031007 A1 | 2/2016 | Cooper et al. | |

\* cited by examiner

*Primary Examiner* — Scott Kastler
(74) *Attorney, Agent, or Firm* — Abel Law Group, LLP

(57) ABSTRACT

A kit enables selective circulation and transfer of molten metal of a furnace. The kit includes a transfer block of refractory material adapted to be disposed downstream of a refractory pump wall of a pump well. The block includes a transfer passageway that extends from alignment with an opening in the pump wall toward an exterior vessel outside the furnace. A support structure can be adapted to be fixed over the furnace. Pulleys can be carried by the support structure. An actuator can be positioned outside of the furnace. A cable can be fastened at one end portion to the transfer block and at another end portion to the actuator and extends around the pulleys. When actuated in one stroke the actuator moves the cable so as to move the block upward out of alignment with the pump wall opening to cause molten metal circulation. When actuated in another stroke the actuator moves the cable to permit the transfer block to move downward into alignment with the pump wall opening to carry out transfer of molten metal to the vessel. Also featured is a furnace including a kit or a selective transfer and circulation device, and a method of installing the kit or device in a furnace.

13 Claims, 3 Drawing Sheets

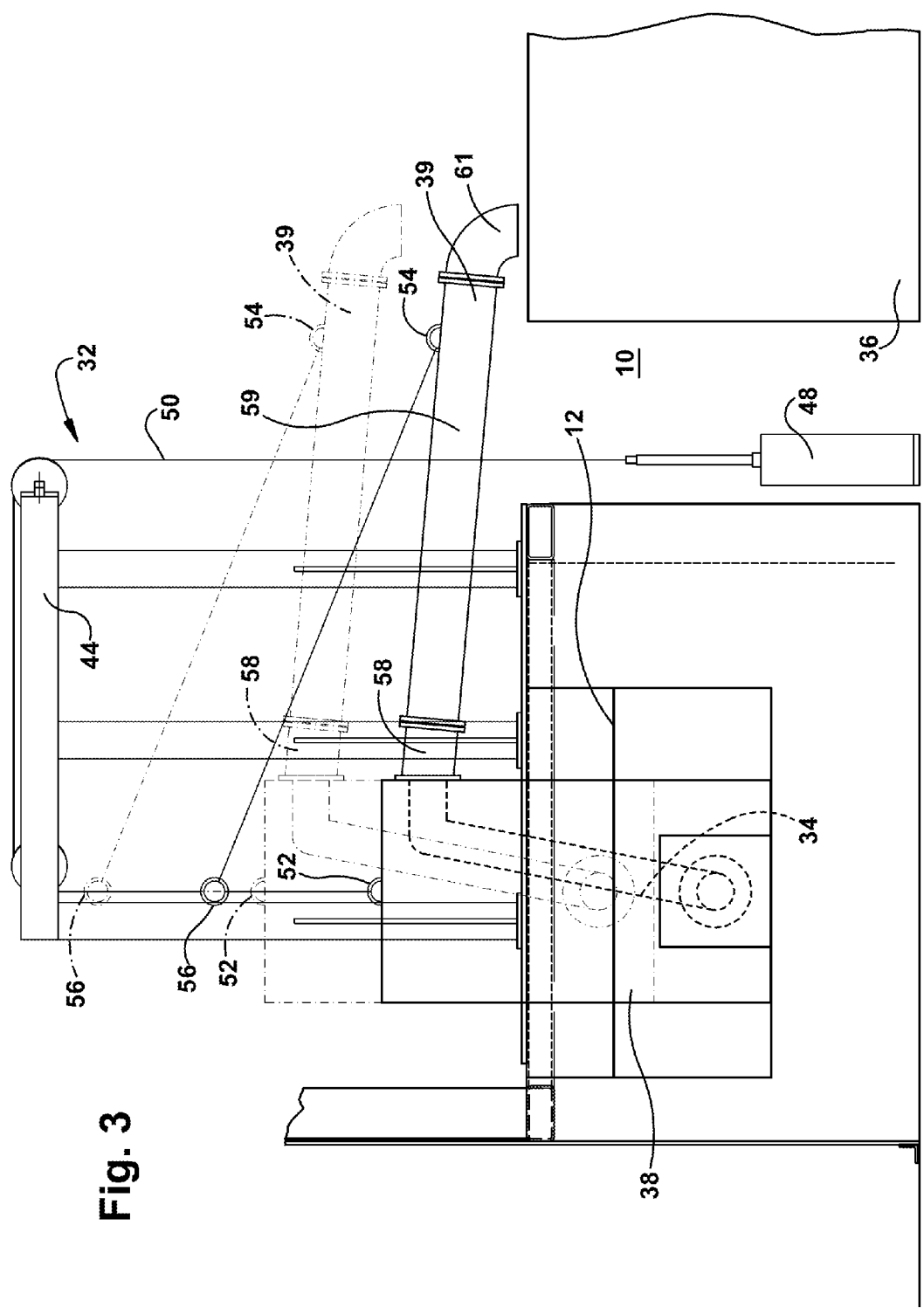

SELECTIVE CIRCULATION AND TRANSFER IN A MOLTEN METAL FURNACE

TECHNICAL FIELD

This disclosure pertains to furnaces and pumps for molten metal and, in particular, to devices that enable circulation and transfer of the molten metal of the furnace.

BACKGROUND

A furnace such as a reverberatory furnace is used in molten metal processing. The furnace includes a main hearth where ingots and/or sows of solid articles of metal to be melted are placed on a sill from which they move into the hearth when melted. The hearth is heated by gas burners, for example. Some furnaces circulate the molten metal in the furnace, for example, using pumps of the types supplied by High Temperature Systems, Inc. Circulation of the molten metal is advantageous in that the molten metal is maintained at a more uniform composition and temperature; also, less heat may be required to maintain the molten metal temperature.

Various devices are used to transfer molten metal out of the furnace. Some furnaces include an opening for tapping the metal of the furnace. This can be hazardous and difficult as the opening may not remain clean over time and may not be sealed effectively.

An effective device is the unique patented Chameleon™ pump supplied by High Temperature Systems, Inc. as disclosed in U.S. Pat. Nos. 7,507,365 and 7,687,017, which are incorporated herein by reference. This is a multifunctional pump that moves an impeller inside an impeller chamber directing the molten metal to different outlets, permitting circulation, transfer or both, using a single pump. A stationary riser extends from the pump to a vessel located outside the furnace, such as above a ladle or crucible. When the pump moves the impeller to transfer mode, the molten metal leaves the pump, travels along the riser and enters the vessel. Circulation could occur simultaneously with the transfer, or at different times.

Molten Metal Equipment Innovations Inc. disclosed pump systems to achieve molten metal transfer from the furnace (see U.S. Pat. Nos. 9,205,490; 8,337,746; and 9,156,087) but they require substantial furnace down time to install. The furnace must be emptied and cooled. Then a separate chamber is constructed adjacent the furnace. A dedicated transfer pump is disposed in the chamber to enable transfer of molten metal from the furnace. This system is disadvantageous in view of the substantial loss in metal processing due to the furnace down time and the cost of constructing another chamber made of refractory. Most importantly, this system is limited in that the pump that is used cannot also carry out circulation but is limited to only molten metal transfer.

SUMMARY OF THE DISCLOSURE

One aspect of the present disclosure features a furnace that is capable of selective circulation and transfer of molten metal. The furnace includes a main hearth and a pump well for containing molten metal. A pump disposed in the pump well pumps the molten metal. A first refractory wall is disposed between the pump well and the main hearth. The first refractory wall includes a first opening permitting passage of molten metal from the main hearth through the wall into the pump well. A second refractory (pump) wall is disposed in the pump well downstream of the pump. The pump wall includes a second opening permitting movement of molten metal out of the pump well through the pump wall opening, into an optional scrap charging well and back into the main hearth. A device for selective circulation and transfer of molten metal includes a movable transfer passageway disposed downstream of the pump wall that is adapted to be aligned with the pump wall opening and to extend toward an exterior vessel disposed outside of the furnace. When the movable passageway is positioned in alignment with the pump wall opening the molten metal is transferred from the furnace to the vessel outside the furnace, for example, to a ladle or crucible. When the passageway is moved out of alignment with the pump wall opening, the pump moves the molten metal through the pump wall opening and circulates it in the furnace.

Specific features of the first aspect of the disclosure will now be described which may be used in any combination. The transfer passageway can be formed in a transfer block of (castable) refractory material. This transfer block can be heavy so as to resist a force of pumped molten metal through the second opening in the pump wall and to remain in contact with the wall during pumping.

Yet another specific feature is a device for achieving selective circulation and transfer of molten metal which includes the following components. A support structure is fixedly disposed over the furnace. Pulleys are carried by the support structure. An actuator (e.g., pneumatic or hydraulic cylinder) is disposed outside the furnace. For example, the actuator can be placed on the floor outside the furnace so as to be away from the heat of the furnace. A cable is fastened at one end portion to the transfer block and at another end portion to the actuator and extends around the pulleys. One stroke of the actuator moves the cable so as to move the block upward out of alignment with the second opening and to carry out circulation of molten metal in the furnace. This is because the pump wall opening is unobstructed. Another (e.g., opposite, up) stroke of the actuator permits the transfer block to move downward into alignment with the pump wall opening to carry out transfer of the molten metal to the exterior vessel. This movement may occur mainly as a result of the weight of the transfer block moving it downward when the cable tension is released or the movement may be more rigidly regulated depending on the structure connecting the transfer block to the cylinder or other actuator.

It should be appreciated throughout the disclosure that this is merely one example of a suitable device for moving the transfer passageway and that variations can occur without departing from the aspects of the present disclosure. For example, up and down strokes may achieve the opposite movement of the transfer block than described in this disclosure and shown in the drawings, items other than metal cable (e.g., chain), or different types of cables may be used. Actuators besides cylinders may be employed (e.g., a screw drive for moving the cable).

In yet another specific feature a metal transfer conduit is fastened to the transfer block and extends from the transfer passageway outside the furnace to a location above the vessel. A plate or flanged conduit may be cast into the transfer block. For example, the plate may include threaded openings and optional bolts. A flange of the conduit may be connected to the cast plate, for example, including threaded openings in the flange aligned with the bolts of the plate and fastening nuts to them. On the other hand, a flanged conduit can be cast into the refractory so as to enable another flanged conduit to be fastened to it. When the transfer block is lowered to its transfer position the conduit moves from a location above the vessel to closer to an upper mouth of the vessel, reducing splashing of molten metal and avoiding detrimental generation of oxides.

Another specific feature is that the transfer block is formed of a castable refractory. One composition of the transfer block is a mixture of aluminum oxide and silicon carbide. The particular refractory composition used in a High Temperature Systems Inc. Coriolis® block may be employed for the transfer block.

Yet another specific feature is that an optional scrap charging well is disposed downstream of the pump well. The first refractory wall is also disposed between the scrap charging well and the main hearth. This wall includes a third opening enabling molten metal to move from the scrap charging well into the main hearth.

A second aspect of the disclosure is a kit for retrofitting existing furnace for selective circulation and transfer with minimal effect on molten metal processing operations during its construction. This kit would permit a simple and cost effective way for the furnace to have selective molten metal circulation and transfer using only a single pump. The kit includes a transfer passageway adapted to be disposed downstream of the refractory pump wall and to extend from alignment with the opening in the pump wall toward the exterior vessel outside of the furnace. Included are means for moving the transfer passageway into alignment with the opening and against the pump wall so as to enable pumped molten metal to be transferred from the furnace along the passageway to the exterior vessel, and for moving the transfer passageway out of alignment with the opening so as to enable pumped molten metal to circulate in the furnace.

Specific features of the above kit that may be used in any combination will now be described. Included as a specific feature is that the transfer block of refractory material is adapted to be disposed downstream of the pump wall. The transfer block includes the transfer passageway that extends from alignment with the opening in the pump wall toward the exterior vessel. The transfer block optionally includes a face that slides on the pump wall. Further included is the support structure adapted to be fixed over the furnace. Pulleys are carried by the support structure. An actuator (e.g., pneumatic or hydraulic cylinder) is positioned outside the furnace. A cable is fastened at one end portion to the transfer block and at another end portion to the actuator and extends around the pulleys. When actuated in one (e.g., down) stroke the actuator moves the cable so as to move the transfer block upward out of alignment with the pump wall opening to cause molten metal circulation. When actuated in another (e.g., up) stroke the actuator permits the transfer block to move downward (optionally sliding against the pump wall) into alignment with the pump wall opening to carry out transfer of molten metal from the furnace to the vessel.

In another specific feature the kit can include the transfer conduit fastened to the transfer block and extending from the transfer passageway outside the furnace to a location above the vessel. This transfer conduit can be formed of metal, e.g., steel.

In a third aspect, the furnace can be modified so as to employ the kit of the disclosure by building the support structure above the furnace, e.g., fixed to the top of the pump wall of the furnace. The support structure would include the pulleys rotatably fastened to it. The support structure and pulleys would be formed of heat resistant materials, e.g., steel. The transfer block would be cast so as to include the transfer passageway inside of it. This would be dimensioned so as to fit the particular furnace design. For example, the passageway would be cast into the block at a location where it would be capable of being aligned with the archway in the pump wall when the transfer block rests on the floor of the furnace and to extend to a sufficient elevation so as to enable the conduit to be connected to the transfer block. The conduit could also be tailored so as to extend at a suitable angle and length to accommodate the location and size of the exterior vessel (e.g., ladle or crucible) to which the molten metal is transferred. The cylinder would be positioned exterior of the furnace to keep it away from the intense heat of the furnace. The cable would be fastened to the cylinder and the transfer block and would travel over the pulleys.

Those skilled in the art would realize in view of this disclosure that the transfer and circulation operations could be remotely controlled and even automated using a touch screen for user input, and a programmable logic controller that would enable signals to be sent to actuate the cylinder or other actuator and to control the timing of its up and down strokes. Further, safety measures could be employed such as the use of IR sensors which would sense volume or height of molten metal transferred to the vessel and when a maximum is reached, to automatically cause the cylinder to be actuated in its down stroke to end molten metal transfer to the vessel, or to cease operation of the pump, and the like.

The device of the present disclosure is advantageous in that it permits circulation and transfer of molten metal of a furnace using a single pump. This is a versatility so far only achieved by the Chameleon® pump by High Temperature Systems Inc. In addition, little or no furnace down time is needed for its construction. No separate costly refractory chamber needs to be built. Despite these cost advantages, this device even outperforms other existing devices. Not only can it simply and inexpensively achieve molten metal transfer, but the same pump is able to carry out circulation, which is not achieved by simple conventional molten metal pumps. For example, the Molten Metal Equipment Innovations pump is dedicated to transfer and cannot achieve the dual circulation and transfer functions of the present device. In addition, the present device can be employed in various types of furnaces and cleanliness of molten metal even in so called dirty metal environments, for example, where automotive components are melted and leave unmeltable articles in the bath. Finally, the present device is versatile in that it does not require a specific pump to be used.

Examples of suitable pumps are disclosed in U.S. Pat. Nos. 9,057,377 and 9,074,601 to Thut, which are incorporated by reference, when designed as a discharge pump and other discharge pumps made by High Temperature Systems Inc. Suitable pumps for pumping molten metal of the type that include a motor driven impeller, such as those made by High Temperature Systems Inc., position the impeller on the end of a shaft inside an impeller chamber of an elongated base having an inlet and outlet from the impeller chamber. The base is submerged in the molten metal. The impeller chamber may include a volute. Upon rotation of the impeller, molten metal is drawn into the base into the impeller chamber and then travels to the outlet of the base. If the pump is a circulation or submerged discharge pump, as is suitable in the aspects of the present disclosure, the outlet of the base extends as a passageway to the outer surface of the base, which circulates the molten metal through the furnace. All of the components of the pump that are in the molten metal environment are typically made of refractory material such as graphite, ceramic, graphite with a ceramic covering or graphite impregnated with a refractory oxide.

A transfer pump has features similar to those of the discharge pump above, but the outlet can lead to a fixed riser spaced apart from the shaft, which extends above the pump to a conduit which directs the molten metal to another location such as to a ladle or to a die casting machine.

The specific features of the first and second aspects can be used in any combination. These features can also be combined with any of the features described in the Detailed Description below.

It should be understood that the above Summary of the Disclosure describes embodiments of the disclosure in broad terms while the following Detailed Description describes embodiments of the disclosure more narrowly and presents specific embodiments that should not be construed as necessary limitations of the invention as broadly defined in the claims. Many additional features, advantages and a fuller understanding of the invention will be had from the accompanying drawings and the Detailed Description that follows.

BRIEF DESCRIPTION OF THE DRAWINGS

FIG. 3 is a front view of the furnace and device of FIG. 1.

DETAILED DESCRIPTION

Figure 1:
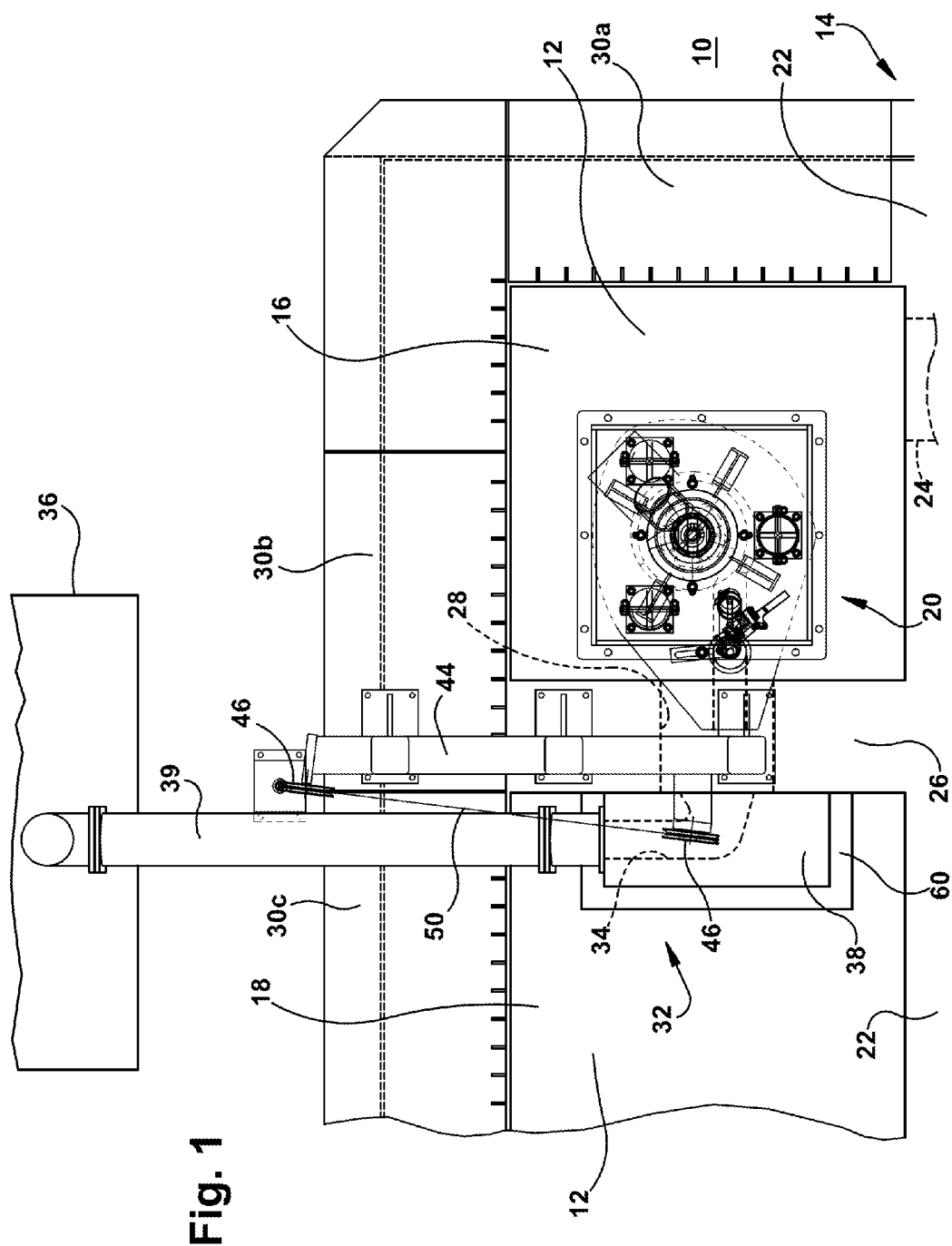
FIG. 1 is a top view of a furnace including a device capable of selective circulation and transfer of molten metal according to the present disclosure.

A furnace 10 is capable of selective circulation and transfer of molten metal 12. The furnace 10 includes a main hearth generally designated 14, a pump well 16 and a scrap charging well 18 in a direction of molten metal circulation. The main hearth 14 contains molten metal and includes a device for heating the molten metal, for example, gas fired burners. The main hearth may include a sill for receiving sows and/or ingots of solid metal for melting into the main hearth. A discharge pump 20 pumps the molten metal 12. A suitable pump may be obtained from High Temperature Systems, Inc. The pump well 16 contains molten metal, the pump 20 being disposed in the pump well. A first refractory wall 22 is disposed between the pump well and the main hearth. The first refractory wall 22 includes a first opening or archway 24 permitting passage of molten metal from the main hearth 14, through the wall 22 and into the pump well. One side of the wall 22 is in the pump well and in the charge well 18 while the other side of it is in the main hearth 14 as known in the art. The first refractory wall 22 can extend for much of the length of the main hearth. A second refractory (pump) wall 26 is disposed so as to include a face located in the pump well downstream of the pump 20. The pump wall 26 includes a second opening or archway 28 permitting passage of molten metal from the pump well, through the pump wall toward the scrap charging well 18. For example, a High Temperature Systems Inc. discharge pump may be positioned such that an elongated discharge passageway of the pump extends into the opening 28. Molten metal then is inlet into a base of the pump into an impeller chamber and discharged out of the discharge passageway leading from the impeller chamber, as a result of rotation of a motor driven rotor or impeller in the impeller chamber. Scrap is melted in the scrap charging well 18 in a known manner. The second refractory wall 26 has a face disposed in the charge well. A third outer refractory wall forms one side 30a of the pump well, and a second side 30b of the pump well parallel to the hearth wall 22 and continues parallel to the hearth wall 22 as an outer portion 30c of the scrap charging well. This wall 30 may have a portion parallel to portion 30a at the opposite end of the furnace that joins with the main hearth wall 22.

The device of the present disclosure is suitable for use in any molten metal, for example, aluminum and zinc, but not limited to these examples.

Figure 2:
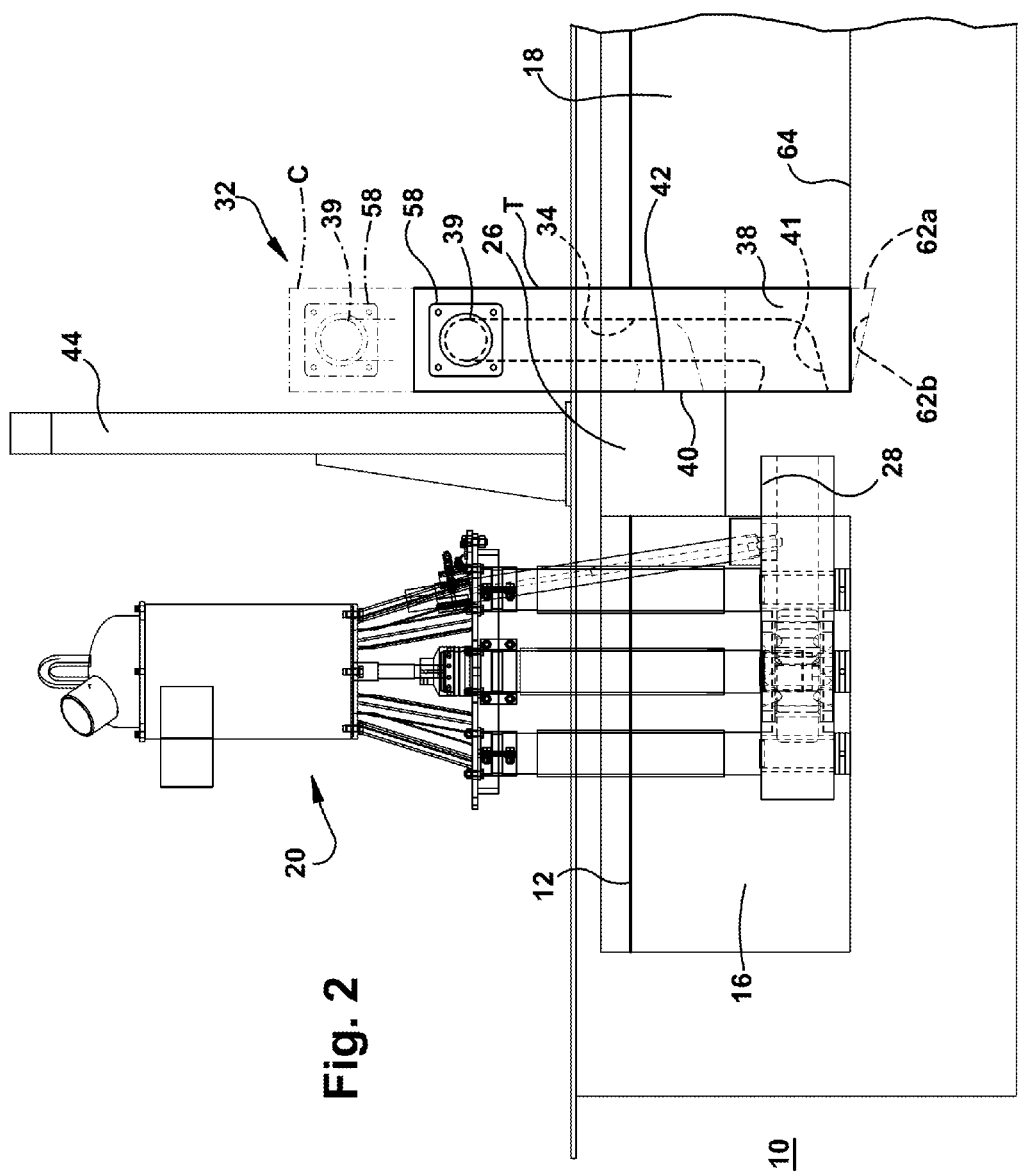
FIG. 2 is a cross-sectional side view of the furnace and device of FIG. 1.

Referring to FIG. 2, a device 32 for selective circulation and transfer of molten metal includes a movable transfer passageway 34 disposed downstream of the pump wall 26 relative to a direction the circulating molten metal flows. The transfer passageway 34 is adapted to be aligned with the pump wall opening 28 (e.g., FIG. 1) and extends toward an exterior vessel 36 outside of the furnace for containing transferred molten metal. When the movable passageway 34 is positioned in alignment with the pump wall opening 28 the pumped molten metal is transferred from the furnace to the vessel 36. Here the passageway completely covers the pump wall opening so that molten metal cannot pass the passageway 34 into the scrap charging well but must flow through the transfer passageway 34. When the transfer passageway 34 is moved out of alignment with the pump wall opening 28, the pump 20 circulates the molten metal in the furnace.

In one example, the transfer passageway 34 is formed in a transfer block 38 of refractory material having an inside face 40 that optionally slides on a downstream face 42 of the pump wall 26 that is located in the scrap charging well. An entrance 41 of the transfer passageway can be flared outward (FIG. 2). The transfer block 38 can be quite heavy (e.g., over a thousand pounds) so as to resist buoyancy in the molten metal and the force of pumped molten metal through the pump wall opening, and to remain near or in contact with the pump wall face 42 and so as to cover the pump wall opening 28 during the transfer operation. A conduit 39 formed of steel or the like can extend from a fixed connection with the transfer block 38 in alignment with the transfer passageway 34, to a location outside the furnace above the vessel 36 (FIG. 3).

A support structure 44 is fixedly disposed over the furnace and can include vertical beams and a horizontal cross beam, made of steel. A steel plate can be fastened to the top of the furnace wall. The support structure 44 may be fastened onto a top of the pump wall 26 and onto the top of the outer wall 30b (and onto the steel plate). Pulleys 46 are rotatably carried by the support structure 44. A pneumatic or hydraulic cylinder 48 is disposed outside the furnace. A steel cable 50 extends between the cylinder 48 and the transfer block 38 and across the pulleys 46. The transfer block can include a half ring 52 fixedly attached to it (FIG. 3) and the conduit 39 can include a half ring 54 fixedly attached to it. A full ring 56 can be used. The cable 50 is attached to and extends between the full ring 56 and the half ring 52 on the transfer block. The cable also attaches to the full ring 56 and the half ring 54 on the conduit. The cable 50 also attaches to the full ring 56 on one end portion and to the cylinder 48 at the other end portion. The cable may be attached to the full ring and half rings using cable clamps or the like. It will be appreciated by one of ordinary skill in the art that other items may be used in place of cable, for example, steel chain. The pulleys can be adapted to receive such chain. In addition other ways of mounting the cable to the transfer block and to the conduit can be used, besides the half ring and full ring which in this example are made of steel.

When actuated in its down stroke the cylinder 48 moves the cable 50 so as to move the block upward to a position C shown in dotted lines in FIG. 2 out of alignment with the pump opening to carry out circulation of molten metal in the furnace. This is because the pump wall opening 28 is unobstructed at its outlet, permitting free passage of the pumped molten metal between the pump and the charging well. When actuated in its up stroke the cylinder 48 moves the cable 50 to permit the transfer block 38 to move downward into a position T in alignment with the pump wall opening 28 to carry out transfer of the molten metal to the exterior vessel 36. This is because the transfer block 38 obstructs the pump wall opening 28 so that the molten metal is forced to travel from the pump, through the pump wall opening 28, along the transfer passageway 34 and out the conduit 39 into the exterior vessel 36.

The metal transfer conduit 39 is fastened to the transfer block 38 and extends from the transfer passageway to a location outside the furnace above the vessel 36. A plate or flanged section of conduit 58 may be cast into the transfer block including threaded openings. If a plate is used, a flange of the conduit 39 may be bolted to the plate. When a flanged conduit section 58 is cast into the transfer block, another flanged section of conduit 59 may be fastened to it. The flanged conduit section 58 and other longer flanged conduit section 59 and any flanged elbow 61 may all be considered to form the transfer conduit 39 that is fastened to the transfer block 38. When the transfer block 38 is lowered to its transfer position T the conduit 39 moves from a location above the vessel downward (dotted lines, FIG. 3) to closer to an upper mouth of the vessel 36 (solid lines), reducing splashing of molten metal and resultant detrimental generation of oxides.

The transfer block 38 is formed of a castable refractory. One composition of the transfer block is a mixture of aluminum oxide and silicon carbide.

It will be appreciated that various devices can be used to maintain the transfer block in position against the pump wall when the transfer operation is carried out. For example, a frame 60 could be positioned and fixed to the pump wall 26 so that the transfer block 38 is contained by the frame and is only permitted substantial movement in a vertical direction. In another variation, the transfer block 38 could include an optional wedge 62*a* (or other shaped protrusion) that fits into a wedge recess 62*b* (or other shaped recess) in the furnace floor 64 of the scrap charging well. This would force the transfer block 38 against the pump wall. One of ordinary skill in the art in reading this disclosure may envision other ways of maintaining the transfer block against the pump wall, which would fall within the spirit and scope of this disclosure.

Moreover, the transfer passageway 34 may formed entirely by a relatively light refractory conduit rather than as an opening in a heavy refractory block. This would also employ a device for maintaining the mouth of the conduit in place against the pump wall and over its opening during transfer.

The device can be in the form of a kit as shown in FIG. 3 for retrofitting an existing furnace 10 with minimal effect on interruption of molten metal processing operations. This kit would permit a simple and cost effective way for the furnace to have selective molten metal circulation and transfer. The kit includes the transfer passageway 34 adapted to be disposed downstream of the pump wall 26 and to extend from alignment with the pump wall opening 28 toward the exterior vessel 36 outside the furnace. Included are means for moving the transfer passageway into alignment with the opening and against the pump wall so as to enable pumped molten metal to be transferred from the furnace along the passageway to the exterior vessel, and for moving the transfer passageway out of alignment with the opening so as to enable pumped molten metal to circulate in the furnace. This means for moving the transfer passageway includes the support structure 44 with pulleys 46 and cable 50, and the cylinder 48, and any input display, PLC and the like.

In one example, the kit includes the transfer block 38 of refractory material adapted to be disposed downstream of the pump wall 26. The transfer block 38 is cast to include the transfer passageway 34 inside of it that extends from alignment with the pump wall opening 28 toward the exterior vessel 36. The transfer block 38 includes a face that optionally slides on the pump wall. Further included is the support structure 44 adapted to be fixed over the furnace. The pulleys 46 are carried by the support structure. The kit can include the pneumatic or hydraulic cylinder 48 positioned outside the furnace. Included is the cable 50 that is fastened to and extends between the cylinder and the transfer block for movement along the pulleys. When actuated in its down stroke, the cylinder 48 moves the cable along the pulleys so as to move the transfer block 38 upward out of alignment with the pump wall opening 26 to cause molten metal circulation. When actuated in its up stroke the cylinder 48 moves the cable along the pulleys so as to cause the transfer block 38 to move downward into alignment with the pump wall opening 26 to carry out transfer of molten metal to the vessel 36.

The kit can include the transfer conduit fastened to the transfer block and extending from the transfer passageway to a location above the vessel.

A furnace would be modified so as to employ the kit of the disclosure by building the support structure 44 above the furnace, e.g., fixing the vertical beams to a top of the pump wall of the furnace and including the horizontal beam. The support structure would include the rotatably fastened pulleys. This would be formed of heat resistant materials such as steel. The transfer block 38 would be cast so as to include the transfer passageway 34. This would be dimensioned so as to fit the particular furnace design. For example, the passageway would be cast into the block at a size and location where it would be capable of covering the dimensions of the archway in the pump wall when the block rests on the floor of the furnace and to extend to a sufficient angle and length at an elevation leading toward the vessel outside the furnace. The conduit 39 could also be tailored so as to extend at a suitable angle and length outside the furnace to accommodate the location and size of the exterior vessel (e.g., ladle or crucible) to which the molten metal is transferred. The conduit could extend to a location above the vessel, for example. The cylinder would be positioned outside of the furnace to keep it away from the intense heat in the furnace. The cable would be fastened to the cylinder and transfer block and travel over the pulleys.

In operation, the pump could operate continuously or intermittently, whenever circulation and/or transfer are desired. Circulation would permit molten metal to travel from the main hearth, into the pump well and into the pump, into any scrap charge well and back to the main hearth. In effect, circulation can be the default operation. During circulation the cylinder is in its down stroke so as to lift the block outside of alignment with the pump wall archway. Thus, molten metal freely travels from the pump well through the pump wall archway into the scrap charging well. Circulation can occur predominantly, until the transfer block is moved to cover the pump wall opening at which time transfer occurs.

When transfer is desired, the cylinder is actuated in its up stroke. This moves the transfer block 38 downward so as to align the transfer passageway 34 with the archway in the pump wall. The block optionally has its face 40 sliding against the face 42 of the pump wall 26 and its weight resists displacement by the pumping molten metal stream into the archway. When the transfer block is moved into its transfer position the pump may be off. Then once the transfer block 38 is in its aligned transfer position and the exterior vessel is in position, the pump can be turned on, which moves the molten metal of the pump well into the transfer passageway of the transfer block 38, through any attached conduit 39 and into the exterior vessel 36. The pump can again be shut down when transfer is complete. Alternatively, the transfer block 38 may be lifted when transfer is complete, without shutting the pump off, ending the transfer operation and proceeding directly back to circulation mode.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:

1. A furnace capable of selective circulation and transfer of molten metal, comprising:
   a main hearth that contains molten metal;
   a pump that pumps molten metal;
   a pump well that contains molten metal, said pump being disposed in said pump well;
   a first refractory wall disposed between said pump well and said main hearth, said first refractory wall including a first opening permitting passage of molten metal through said first refractory wall;
   a second refractory pump wall disposed in said pump well downstream of said pump, said second pump wall including a second opening permitting molten metal to leave said pump well;
   a device for enabling selective molten metal circulation and transfer including:
      a movable elongated transfer conduit disposed downstream of said second pump wall that is adapted to be aligned with said second opening and to extend from said second opening to a vessel disposed outside the furnace for containing the molten metal;
   wherein when said elongated transfer conduit is positioned in alignment with said second opening said molten metal is transferred from said furnace to said vessel; and
   wherein when said elongated transfer conduit is moved out of alignment with said second opening said pump circulates the molten metal in said furnace.

2. The furnace of claim 1 wherein said elongated transfer conduit is a part of an assembly including a transfer block of refractory material.

3. The furnace of claim 2 comprising a support structure over said furnace, pulleys carried by said support structure, an actuator and a cable extending between said actuator and said transfer block around said pulleys, wherein when said actuator is actuated in one stroke said cable moves said transfer block upward out of alignment with said second opening to carry out said circulation and wherein when said actuator is actuated in another stroke said transfer block moves downward into said alignment with said second opening to carry out said transfer.

4. The furnace of claim 2 wherein said transfer block is formed of a castable refractory.

5. The furnace of claim 1 comprising a scrap charging well disposed downstream of said pump well.

6. A device for selective circulation and transfer of molten metal of a furnace, the furnace including a main hearth and a pump well including a refractory pump wall having a pump wall opening, and a pump in the pump well that pumps the molten metal, said device comprising:
   an elongated transfer conduit adapted to be disposed downstream of the pump wall and to be aligned with the opening in the pump wall, said elongated transfer conduit having a length adapted to extend from the opening to an exterior vessel disposed outside the furnace;
   means for moving said elongated transfer conduit into alignment with the opening and against the pump wall so as to enable pumped molten metal to be transferred from said furnace along said elongated transfer conduit to the exterior vessel, and for moving said elongated transfer conduit out of alignment with the opening so as to enable pumped molten metal to circulate in the furnace.

7. A kit for selective circulation and transfer of molten metal of a furnace, the furnace including a main hearth and a pump well including a refractory pump wall having a pump wall opening, and a pump in the pump well that pumps the molten metal, said kit comprising:
   a transfer block of refractory material adapted to be disposed downstream of the pump wall, said transfer block including an elongated transfer conduit that can be aligned with an opening in the pump wall, said elongated transfer conduit having a length that extends from the opening to an exterior vessel disposed outside the furnace;
   a support structure adapted to be fixed over the furnace;
   pulleys carried by said support structure;
   an actuator positioned outside the furnace; and
   a cable fastened at one end portion to said transfer block and at another end portion to said actuator and extending around said pulleys;
   wherein when actuated in one stroke said actuator moves said cable so as to move said transfer block upward out of alignment with the pump wall opening to cause molten metal circulation; and
   wherein when said actuator is actuated in another stroke said transfer block moves downward into alignment with the pump wall opening to carry out transfer of molten metal to the exterior vessel.

8. The kit of claim 7 wherein said transfer block is formed of a castable refractory.

9. A method of adapting a furnace so as to include the kit of claim 7, comprising:
   fastening said support structure to a top surface of a wall of the furnace;
   dimensioning said elongated transfer conduit when casting said transfer block so as to enable said elongated transfer conduit to fit dimensions of the furnace including large enough to cover the pump wall opening dimension and at an angle and for a distance to extend from the pump wall opening to a location outside the furnace near said exterior vessel;
   positioning said cable on said pulleys; and
   fastening said cable to said transfer block and to said actuator.

10. A method of selective circulation and transfer of molten metal, comprising:
    providing a device including:

an elongated transfer conduit disposed downstream of a pump well containing a pump for pumping molten metal, said pump well including a pump wall including a wall opening permitting molten metal to flow out of said pump well, said elongated transfer conduit being adapted to be aligned with the wall opening and to extend from the wall opening to an exterior vessel disposed outside the furnace for containing the molten metal;

conducting a circulation mode comprising moving said elongated transfer conduit out of alignment with the wall opening, thereby permitting flow of pumped molten metal through the wall opening opening into a downstream well of the furnace; and conducting a transfer mode comprising moving said elongated transfer conduit in alignment with the wall opening, thereby permitting flow of pumped molten metal along said elongated transfer conduit out of the furnace and to said exterior vessel.

11. The method of selective circulation and transfer of molten metal of claim 10 wherein said elongated transfer conduit forms part of a transfer block of cast refractory material.

12. The method of selective circulation and transfer of molten metal of claim 10 wherein in said circulation mode said elongated transfer conduit is moved upward out of alignment with the wall opening and such that an outlet of said elongated transfer conduit is at an upper location above said exterior vessel, and in said transfer mode said elongated transfer conduit is moved downward into alignment with the wall opening and such that said outlet of said elongated transfer conduit is at a lower location above said exterior vessel.

13. The furnace of claim 2 including a recess formed in a floor of said furnace in which a protrusion of said transfer block is received in a lower position when said elongated transfer conduit is aligned with said second opening.

* * * * *